United States Patent
Dalton et al.

(10) Patent No.: US 7,418,525 B2
(45) Date of Patent: Aug. 26, 2008

(54) SHARED SIMULTANEOUSLY-CONNECTED REMOVABLE DRIVES AND SERVERS EACH HOUSING AN I/O CONTROLLER WHICH MAINTAINS AN UNINTERRUPTED PROTOCOL CONNECTION

(75) Inventors: James William Dalton, Durham, NC (US); Eric Richard Kern, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 10/977,896

(22) Filed: Oct. 29, 2004

(65) Prior Publication Data

US 2006/0095595 A1    May 4, 2006

(51) Int. Cl.
G06F 3/00       (2006.01)
G06F 13/00      (2006.01)

(52) U.S. Cl. ............... 710/5; 710/8; 710/9; 710/10; 710/34; 710/38; 710/316; 709/203; 709/211; 714/1; 714/4; 714/7

(58) Field of Classification Search .............. 710/5, 710/8–10, 34, 38, 316; 709/203, 211; 714/1, 714/4, 7
See application file for complete search history.

(56) References Cited

U.S. PATENT DOCUMENTS

| | | | |
|---|---|---|---|
| 6,321,238 B1 | 11/2001 | Putzolu | |
| 6,438,663 B1 | 8/2002 | Agarwal et al. | |
| 6,694,317 B1 | 2/2004 | Stakutis et al. | |
| 7,269,630 B2 * | 9/2007 | Abbondanzio et al. | 709/211 |
| 2001/0014929 A1 | 8/2001 | Taroda et al. | |
| 2003/0191908 A1 | 10/2003 | Cohn et al. | |
| 2005/0021654 A1 * | 1/2005 | Kern et al. | 709/211 |

* cited by examiner

*Primary Examiner*—Tammara R Peyton
(74) *Attorney, Agent, or Firm*—Cynthia S. Byrd

(57) ABSTRACT

Local drive presence is provided for local and remote drives by maintaining a plurality of uninterrupted protocol connections between a plurality of I/O controllers and a plurality of device interfaces through which peripheral bus commands are transmitted. Preferably, the I/O controllers are each housed in a separate server blade and provide each blade with access to the local and remote drives. At each of the device interfaces, rather than attaching an actual storage device, peripheral bus commands received at the device interfaces are serialized and conditionally passed or suppressed to and from the shared drive which is shared amongst the plurality of uninterrupted protocol connections. Preferably, the plurality of uninterrupted protocol connections is maintained such that the shared drives can be simultaneously shared. In one embodiment, the local drives are provided in a media tray which is shared amongst a plurality blades.

7 Claims, 8 Drawing Sheets

FIG. 8

Drive Access Request

Select the Blade for which access is requested and indicate whether the requested access is to be exclusive.

○ Blade 1     ○ Blade 8
○ Blade 2     ○ Blade 9
○ Blade 3     ○ Blade 10
○ Blade 4     ○ Blade 11
○ Blade 5     ○ Blade 12
○ Blade 6     ○ Blade 13
○ Blade 7     ○ Blade 14

☐ Exclusive

Cancel     OK

FIG. 9

Drive Selection

Indicate which drive is to be accessed and enter authentication data if required.

☑ DVD-ROM     ☐ Floppy Drive
☐ N.A.S. ...   -- Select N.A.S. Device -- ▼

Login ID _____
Password _____

Cancel     OK

FIG. 7

Access Control Matrix (14 x N)

| _118_ Blade No. (or Asset) | DVD-ROM (LUN 0) | | | |
|---|---|---|---|---|
| | _120_ Exclusive Request (Timestamp) | _122_ Exclusive Grant (0 or 1) | _124_ Access Type (1, 2, 3, etc.) | _126_ Access Granted (0 or 1) |
| 1 | | 0 | 1 | 1 |
| 2 | | 0 | 1 | 1 |
| 3 | | 0 | 1 | 1 |
| 4 | | 0 | 1 | 1 |
| 5 | | 0 | 1 | 1 |
| 6 | | 0 | 1 | 1 |
| 7 | | 0 | 1 | 1 |
| 8 | | 0 | 1 | 1 |
| 9 | | 0 | 1 | 1 |
| 10 | | 0 | 1 | 1 |
| 11 | | 0 | 1 | 1 |
| 12 | | 0 | 1 | 1 |
| 13 | | 0 | 1 | 1 |
| 14 | | 0 | 1 | 1 |

Network Attached Storage (LUN N)
Floppy Drive (LUN 1)
DVD-ROM (LUN 0)

SHARED SIMULTANEOUSLY-CONNECTED REMOVABLE DRIVES AND SERVERS EACH HOUSING AN I/O CONTROLLER WHICH MAINTAINS AN UNINTERRUPTED PROTOCOL CONNECTION

BACKGROUND OF THE INVENTION

This invention pertains to computer systems and other information handling systems and, more particularly, to a Blade Center comprising a plurality of server Blades in which local drives, typically removable media drives, can be shared while maintaining a full-time device connection between the individual server blades and a respective I/O device interface which serves as a conduit to the drives.

When computer system servers are provided in close proximity in order to increase the density of servers in a given volume of space, it is common to share lesser-used resources such as CD-ROM, floppy, keyboard, video, and mouse. Attempts have been made to share such resources by electrically switching a resource to the server needing the resource. This has been accomplished by using a switch or a multiplexer.

While such switching tends to not produce problems in relatively stateless interfaces such as analog video, Applicants have discovered that interfaces having states which depend on prior states can be disrupted by the untimely switching, whether in or out, of the interface connection. USB is one such interface which has been discovered to be problematic when attempting to share a removable media drive such as a CD-ROM.

USB is an I/O bus having an asymmetric design. A single host-side controller is able to act as a master and connects to multiple devices directly or to hubs to extend the total number of devices connected to a single host.

When hubs are used to extend the bus, the hubs are connected in a tree-like structure. Hosts include at least one hub and up to 127 devices may be connected to a single host, but the count must include the hub devices as well, so the total useful number of connected devices is somewhat diminished.

The untimely switching of a USB device on a USB interface can cause state machine errors in the USB host controller, USB hub, or USB device interface. Even where the switching is electronically controlled such that these errors are shunned, operating system drivers containing higher level state machines can be equally confounded by the switch. For example, it is known that copying the contents of a folder from an untimely switched USB drive can result in a copy operation wherein only a portion of the files in the folder are actually copied over. Although a warning message is displayed, the user is left with a logistically difficult situation: the drive is no longer accessible and the names of the missing files are unknown.

Another problem inherent to the switched design is that a switched drive cannot be shared amongst the different servers. Accordingly, should a network administrator desire to install a new version of Linux on all of the servers that have access to the shared drive, the administrator must wait for the complete installation to complete in order to begin installation on the different server. This increases the cost of maintenance which is known to be a significant factor in the purchase of a product.

SUMMARY OF THE INVENTION

It has been discovered that the above challenges and problems are solved by maintaining a plurality of uninterrupted protocol connections between a plurality of I/O controllers and a plurality of device interfaces through which peripheral bus commands are transmitted. The uninterrupted protocol connections eliminate the need for electrical switching using a switch matrix or the like; although in a practical product, electrical switching can optionally be implemented in conjunction with aspects of this invention for compatibility with existing product.

At each of the device interfaces, rather than attaching an actual storage device, peripheral bus commands received at the device interfaces are serialized and conditionally passed or suppressed to and from a storage device which is shared amongst the plurality of uninterrupted protocol connections. Preferably, the plurality of uninterrupted protocol connections is maintained such that the storage device can be simultaneously shared.

According to one aspect of the present invention, apparatus is provided which includes a storage device, a plurality of device interfaces, a processor, and a plurality of I/O controllers. The processor operatively couples the plurality of device interfaces to the storage device. The plurality of I/O controllers send peripheral bus commands to the device interfaces as if a storage device were present at each of the device interfaces. The processor conditionally passes or suppresses commands received at the device interfaces.

In response to receiving a specific command originating from a specific one of said I/O controllers, the processor conditionally passes the specific command to the storage device and returns the result of the specific command through the specific one of the I/O controllers in response to a predetermined condition. Alternatively, the processor suppresses the specific command to the storage device and returns an indication through the specific one of the I/O controllers that no media is present irrespective of whether media is present in the storage device. The processor suppresses the specific command and returns the indication in response to a lack of the predetermined condition.

While not required, the indication that no media is present can be utilized even where the storage device is a standard hard drive. This can be done, for example, by presenting a non removable media drive as a removable media drive.

The predetermined condition which controls whether the processor passes or suppresses the specific command can be any condition. For example, the condition can be related to attributes which are related to the type of storage device utilized. While the present invention is not limited to any particular type of storage device, a removable media drive is shown in one of the embodiments. In the specific example of a removable media drive which is shared amongst a plurality of I/O controllers each maintaining a simultaneous uninterrupted protocol connection to a plurality of device interfaces, the unique configuration of the present apparatus allows for the removable media drive to be shared simultaneously amongst all of the I/O controllers. This scenario is often desirable and thus the predetermined condition can be related to share attributes. According to this scenario, share attributes can be initially set such that the removable media drive is shared amongst all I/O controllers present and can be reset as desired. Should a user at one of the I/O controllers desire exclusive access, as in for example when a DVD ROM containing sensitive data is inserted into a DVD ROM removable media drive, the share attributes can be disabled for all but the one I/O controller.

The predetermined condition can also be user-related or can be related to any other asset associated with the I/O controller or the apparatus which contains the I/O controller. Thus, a particular user at a particular I/O controller can be excluded from access to the storage device. Accordingly, a matrix can be maintained by the processor which controls access to the storage device and the processor can pass or suppress any specific command based on this matrix.

In a preferred embodiment of the present invention, the uninterrupted protocol connection is a logical connection. For example, while the I/O controller maintains an uninterrupted protocol connection with a device interface, the device interface itself can be implemented by other than an actual device. This is one form of virtualization; e.g., a microcontroller can maintain a state machine for an I/O device which is actually not present. Where the I/O controller is implemented as a physical device, the microcontroller implementation reserves a number of physical pins which correlate to the device interface type for an actual connection to the I/O controller.

However, the use of a nonphysical I/O controller is contemplated. Where a nonphysical I/O controller is utilized, the corresponding device interfaces are also nonphysical. In this case, the plurality of uninterrupted protocol connections is maintained in software.

In one embodiment, the uninterrupted protocol connection is to a physical I/O device which provides the device interface. For example, where the I/O controllers are USB host controllers, the uninterrupted protocol connection is to a physical USB device such that each USB host controller maintains an uninterrupted USB protocol connection to an actual USB device.

In one embodiment, the peripheral bus commands are encapsulated as sub-commands of the protocol maintained by the plurality of I/O controllers. In this embodiment, the sub-commands can be to a protocol which is other than the protocol maintained by the plurality of I/O controllers. As an example, where the I/O controllers are USB host controllers and the devices are USB devices (whether logical or physical), the peripheral bus commands can be encapsulated in a USB packet and be other than USB commands. Downstream circuits, such as the processor, can strip off the USB wrapper to obtain the sub-commands.

According to one aspect of the present invention, apparatus is provided which includes a removable media drive, a plurality of device interfaces, a processor, and a plurality of server blades. An I/O controller is housed within each server blade. The I/O controller in each server blade maintains an uninterrupted protocol connection with one of the device interfaces and sends removable media drive commands over the interface. The processor operatively couples the plurality of device interfaces to the removable media drive. The plurality of I/O controllers send peripheral bus commands to the device interfaces as if a removable media drive were present at each of the device interfaces. The processor conditionally passes or suppresses commands received at the device interfaces.

In response to receiving a specific command originating from a specific one of said I/O controllers housed in the plurality of server blades, the processor conditionally passes the specific command to the removable media drive and returns the result of the specific command through the specific one of the plurality of server blades in response to a predetermined condition. Alternatively, the processor suppresses the specific command to the removable media drive and returns an indication through the specific one of the plurality of server blades that no media is present in response to a lack of the predetermined condition. The indication is sent irrespective of whether media is present in the removable media drive. For example, if the predetermined condition is whether or not a specific blade or an asset of a specific blade has access rights to the removable media drive, and if it is thereafter determined that an access is to be given, the processor passes commands and returns results. Where a given server blade has access, should there not be media in the drive, indication that no media is present is given as normal. However, where a given server is not to be given access, indication that no media is present is returned even where media is present in the removable media drive.

In a specific embodiment, the removable media drive is local. However, remote storage, such as a network drive, is contemplated.

According to one aspect of the present invention, apparatus is provided which includes a local removable media drive, a plurality of first device interfaces conforming to a first protocol, a processor, and a plurality of I/O controllers. The plurality of first device interfaces conforms to a first protocol while the processor emulates mass storage devices which conform to a second protocol and which appear at each of the first device interfaces. The processor operatively couples the plurality of first device interfaces to the local removable media drive by maintaining a software stack at each of the device interfaces. Each software stack operates independently while emulating the mass storage devices. This is one approach in which a device can be made to appear at each of the device interfaces such that the I/O controllers can maintain an uninterrupted protocol connection.

The single local removable-media drive in this embodiment is shared as multiple mass storage devices at each of the device interfaces. Accessed portions of the drive media can be cached in a unified cache, or individual caches can be maintained at each of the software stacks which emulate the mass storage devices.

In this embodiment, the plurality of I/O controllers encapsulate second protocol commands within a first protocol wrapper. The wrapper is sent across the uninterrupted connection according to the first protocol. For example, the second protocol can be the SCSI protocol such that the emulated mass storage devices appear as SCSI mass storage devices behind each of the interfaces. For encapsulation, the I/O controller is selected to support the encapsulation of SCSI sub-commands.

The processor derives the encapsulated second protocol commands from the first protocol commands, translates the derived second protocol commands to a third protocol which corresponds to the protocol of the drive, and serializes and redirects the translated commands to the drive. The serialization of the commands eliminates any contention as the commands are received and sent to the drive. The third protocol can be, for example, any of the standard disk drive protocols such as EIDE, USB, Firewire, SCSI, and Ethernet (for network attached storage), any of which may be an interface to any of the other protocols.

The processor, in response to receiving a specific command originating from a specific one of the I/O controllers and thereafter translating the specific command into a specific translated command, passes or suppresses the specific translated command in response to the predetermined condition as described above. Where the predetermined condition is extant, the processor passes the specific translated command to the drive and returns the result of the specific translated command through the specific one of said I/O controllers in response to the predetermined condition. In returning the command, the processor reverse translates and encapsulates the result as needed. Where the predetermined condition is not present, the processor suppresses the specific translated command to said drive and returns an indication through the specific one of said I/O controllers that no media is present irrespective of whether media is present in the drive.

In a preferred embodiment, the first and third protocols are USB protocols and the second protocol is the SCSI protocol.

According to one aspect of the present invention which addresses the aforementioned challenges, a method is provided which includes maintaining uninterrupted protocol connections, sending device commands across the connections, emulating mass storage devices, and receiving, serializing and conditionally redirecting the commands to a removable-media drive. The commands are sent from a plurality of independent server blades through an I/O controller included in each server blade. The uninterrupted protocol connections are maintained between the I/O controllers and a plurality of device interfaces. Each device interface corresponds to one of the I/O controllers. The emulated mass storage devices are emulated to appear at one end of each device interface to which the commands are sent.

In response to receiving a specific command received through a specific device interface, the method further includes passing or suppressing the specific command in response to the predetermined condition. Where the predetermined condition is extant, the specific command is passed to the removable-media drive and the result of the specific command is returned through the specific device interface. Where the predetermined condition is lacking, the specific command to the removable-media drive is suppressed and an indication is returned through the specific device interface that no media is present. The indication is returned irrespective of whether media is present in the removable-media drive.

In one embodiment, the specific command is associated with a specific one of the server blades. The association can be based upon the device interface through which the specific command is received such that the command can be returned to the specific one of the server blades. In this way, server blade specific data, including ancillary data, can be returned.

According to one aspect of the present invention, a method is provided which includes sending device commands, maintaining uninterrupted first protocol connections, emulating a plurality of mass storage devices, and deriving, translating, serializing and conditionally redirecting the translated commands to a local removable media drive. The commands are sent from a plurality of independent server blades through an I/O controller included in each server blade. The uninterrupted first protocol connections are maintained such that they conform to a first protocol which regulates the communication between the I/O controllers and a plurality of device interfaces. Each of the device interfaces corresponds to a corresponding one of the I/O controllers. The emulated mass storage devices are emulated to conform to a second protocol and are made to appear at one end each device interface. The I/O controllers direct the commands to the emulated mass storage devices through the uninterrupted first protocol connections. The commands conforming to the first protocol themselves encapsulate commands according to the second protocol. The second protocol commands directed to the emulated mass storage devices can be encapsulated entirely by the I/O controllers at each server blade should the I/O controller support that feature, or, the encapsulation can occur at a higher level such as in software at the individual server blade should the encapsulation of sub-commands not be supported in hardware at the I/O controller.

The derivation is of the encapsulated second protocol commands from the first protocol commands. After deriving the encapsulated second protocol commands, the second protocol commands are translated to a third protocol. The third protocol corresponds to the protocol of the drive. To avoid contention, since the commands in this embodiment are received by the multiple uninterrupted connections simultaneously, the translated commands are serialized and conditionally redirected to the drive.

In response to receiving a specific command received through a specific device interface, the method provides for either passing or suppressing the specific command in response to the predetermined condition as previously described. If the predetermined condition exists, the method provides for passing the specific command to the drive and returning the result of the specific command to the specific device interface. If the predetermined condition is not present, the method provides for suppressing the specific command to the drive and returning an indication through the specific device interface that no media is present irrespective of whether media is present in the drive.

In a preferred embodiment, the specific commands are associated with a specific one of the server blades. The association can be accomplished, for example, by reserving one or more bits in a data structure that identifies which server blade is to be associated with the specific command. The data structure can be stored in a header which is passed along with the specific command or result or otherwise appended to the specific command or result and stripped off as needed. The data structure can also be stored in a register or in a memory and a state machine which has access to the data structure can be maintained which keeps track of which commands have been sent to the drive such that the result can be returned to the appropriate server blade. A command queue can be maintained in first-in first-out order or in any other order as desired.

As in other embodiments, the predetermined condition can be that an asset which relates to specific one of the server blades is authorized to access the drive. This asset can be, for example and not for limitation, the user of the specific server blade, the serial number of the specific server blade, or any asset which relates to the configuration of the specific server blade.

The association can be based upon any asset. This includes an asset which is not specific to a characteristic of the blade. As an example, the association can be based upon the device interface through which the specific command is received. However, it is preferable that the association is based upon a specific asset of the server blade in order to support security features.

In a preferred embodiment, the first and third protocols are USB protocols, and the second protocol is the SCSI protocol. Preferably, at least the first protocol supports encapsulation of SCSI sub-commands. The third protocol need not be a USB protocol and need only be the protocol of the physical drive which is shared amongst the plurality of independent server blades. Thus it is anticipated that the third protocol can be any of the peripheral plus protocols in use in the industry including EIDE, SCSI, FireWire, USB, or even ethernet or other LAN protocol for use with, for example, network attached storage.

Implementations of the invention include implementations as apparatus programmed to execute the method or methods described herein, and as a computer program product comprising a computer readable medium having computer readable instructions stored thereon.

Implementations of the invention further include providing any of the various aspects of the invention to a customer. Accordingly, implementations of the invention include implementations as a service in which any of the method, apparatus, and program product aspects, alone or in combination, are deployed at a customer site to address the above described challenges.

Although not required to practice the invention, providing simultaneous access to the drive is preferable. A system configured according to any of the simultaneously-shared-drive embodiments provides that administrator attempting to install a common operating system on all the server blades of a multiple server blade system with the ability to initiate operating system installation on all of the blades simultaneously and then leave the premises. This example assumes that the entirety of the operating system is contained in a single disk. Assuming a single disk which is inserted into the drive, eventually the entire contents of the drive is cached by the processor and the data dispatched to all of the blades as requested.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Some of the purposes of the invention having been stated, others will appear as the description proceeds, when taken in connection with the accompanying drawings, in which:

FIG. 7 depicts a 14×N matrix maintained in memory according to an embodiment of the present invention for controlling access to shared simultaneously-connected drives;

FIG. 8 shows a user interface screen for allowing a user to request access to a shared simultaneously-connected drive for particular blade and optionally allows the user to select exclusive access;

FIG. 9 shows a user interface screen for allowing a user to specify specific drive data and authentication data.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Server Blade System Overview

Figure 1:
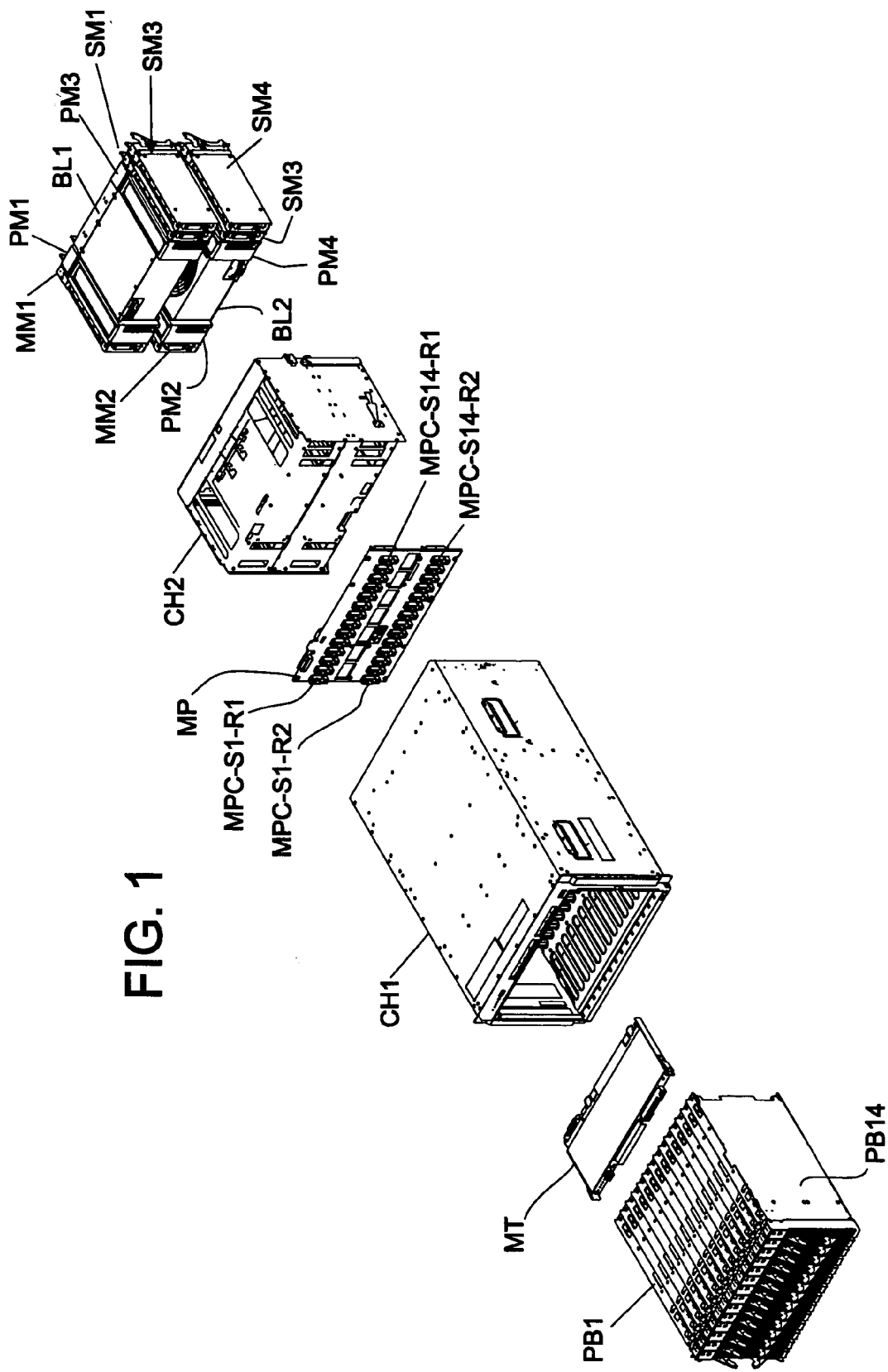
FIG. 1 is a front, top and right side exploded perspective view of a server blade system according to one embodiment of the present invention.

Referring now more particularly to the accompanying drawings, in which like numerals indicate like elements or steps throughout the several views, FIG. 1 is a front, top and right side exploded perspective view of a server blade system. Referring to this figure, main chassis CH1 houses all the components of the server blade system. Up to 14 processor blades PB1 through PB14 (or other blades, such as storage blades) are hot pluggable into the 14 slots in the front of chassis CH1. The term "server blade," "processor blade," or simply "blade" is used throughout the specification and claims, but it should be understood that these terms are not limited to blades that only perform "processor" or "server" functions, but also include blades that perform other functions, such as storage blades, which typically include hard disk drives and whose primary function is data storage.

Processor blades provide the processor, memory, hard disk storage and firmware of an industry standard server. In addition, they include keyboard, video and mouse ("KVM") selection via a control panel, an onboard service processor, and access to the floppy and DVD-ROM drives in the media tray. A daughter card is connected via an onboard PCI-X interface and is used to provide additional high-speed links to switch modules SM3 and SM4 (described below). Each processor blade also has a front panel with 5 LED's to indicate current status, plus four push-button switches for power on/off, selection of processor blade, reset, and NMI for core dumps for local control.

Blades may be 'hot swapped' without affecting the operation of other blades in the system. A server blade is typically implemented as a single slot card (394.2 mm×226.99 mm); however, in some cases a single processor blade may require two slots. A processor blade can use any microprocessor technology as long as it compliant with the mechanical and electrical interfaces, and the power and cooling requirements of the server blade system.

For redundancy, processor blades have two signal and power connectors; one connected to the upper connector of the corresponding slot of midplane MP (described below), and the other connected to the corresponding lower connector of the midplane. Processor Blades interface with other components in the server blade system via the following midplane interfaces: 1) Gigabit Ethernet (2 per blade; required); 2) Fibre Channel (2 per blade; optional); 3) management module serial link; 4) VGA analog video link; 5) keyboard/mouse USB link; 6) DVD-ROM and floppy disk drive ("FDD") USB link; 7) 12 VDC power; and 8) miscellaneous control signals. These interfaces provide the ability to communicate to other components in the server blade system such as management modules, switch modules, the DVD-ROM and the FDD. These interfaces are duplicated on the midplane to provide redundancy. A processor blade typically supports booting from the media tray DVD-ROM or FDD, the network (Fibre channel or Ethernet), or its local hard disk drive.

A media tray MT includes a floppy disk drive and a DVD-ROM or CD-ROM drive that can be logically and/or physically coupled to any one of the 14 blades. These drives, and other drives such as remote network attached storage, are made shareable using the techniques which are to be explained in greater detail below under the heading "Shared Simultaneously-connected Drive Implementation." The media tray also houses an interface board on which is mounted interface LED's, a thermistor for measuring inlet air temperature, and a 4-port USB controller hub. System level interface controls consist of power, location, over temperature, information, and general fault LED's and a USB port.

Midplane circuit board MP is positioned approximately in the middle of chassis CH1 and includes two rows of connectors; the top row including connectors MPC-S1-R1 through MPC-S14-R1, and the bottom row including connectors MPC-S1-R2 through MPC-S14-R2. Thus, each one of the 14 slots includes one pair of midplane connectors located one above the other (e.g., connectors MPC-S1-R1 and MPC-S1-R2) and each pair of midplane connectors mates to a pair of connectors at the rear edge of each processor blade (not visible in FIG. 1).

Figure 2:
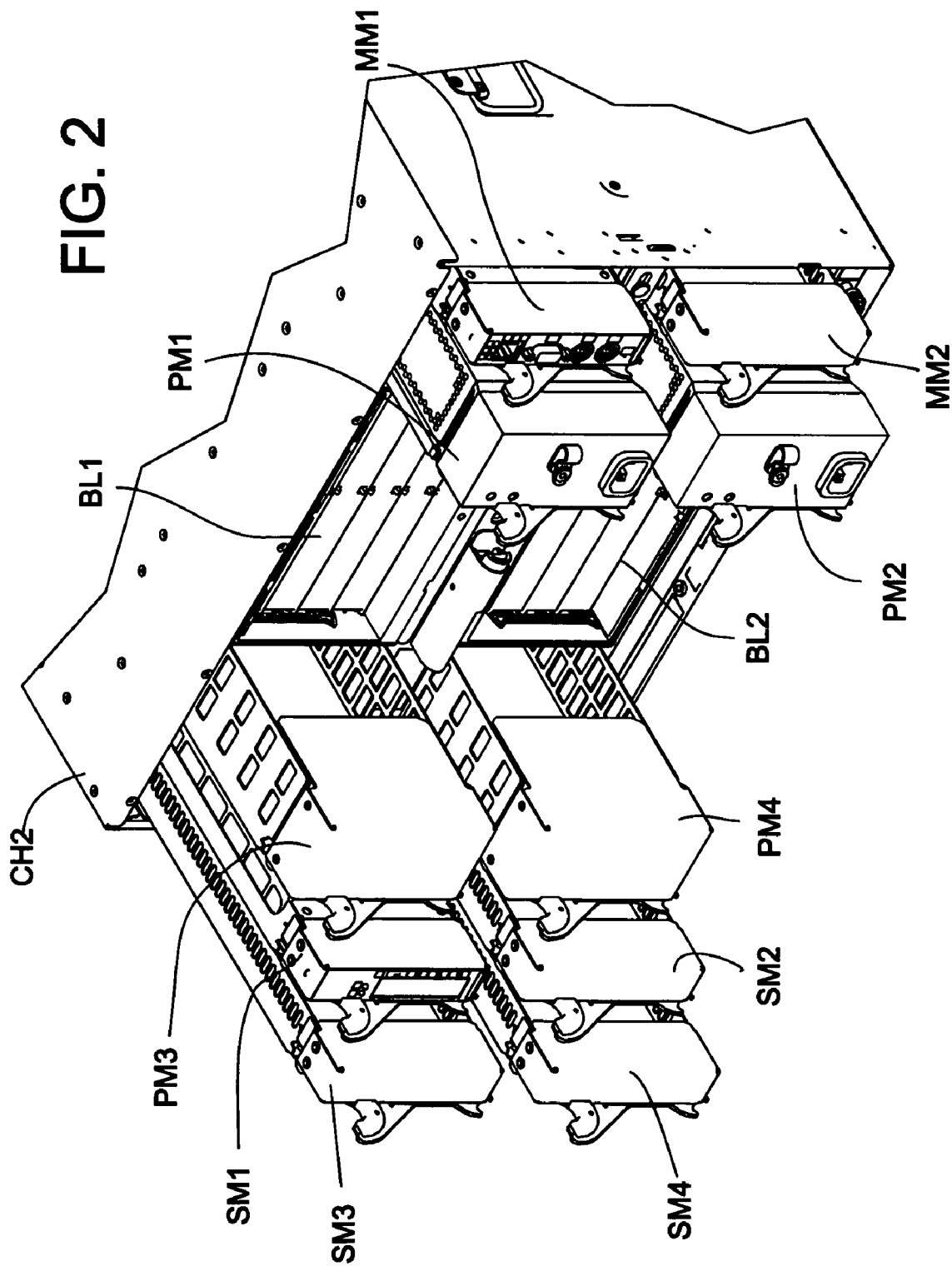
FIG. 2 is a rear, top and left side perspective view of the rear portion of the server blade system.

FIG. 2 is a rear, top and left side perspective view of the rear portion of the server blade system. Referring to FIGS. 1 and 2, a chassis CH2 houses various hot-pluggable components for cooling, power, control and switching. Chassis CH2 slides and latches into the rear of main chassis CH1.

Two hot-pluggable blowers BL1 and BL2 include backward-curved impeller blowers and provide redundant cooling to the server blade system components. Airflow is from the front to the rear of chassis CH1. Each of the processor blades PB1 through PB14 includes a front grille to admit air, and low-profile vapor chamber based heat sinks are used to cool the processors within the blades. Total airflow through the system chassis is about 300 CFM at 0.7 inches H2O static pressure drop. In the event of blower failure or removal, the speed of the remaining blower automatically increases to maintain the required air flow until the replacement unit is installed. Blower speed control is also controlled via a thermistor that constantly monitors inlet air temperature. The temperature of the server blade system components are also monitored and blower speed will increase automatically in response to rising temperature levels as reported by the various temperature sensors.

Four hot-pluggable power modules PM1 through PM4 provide DC operating voltages for the processor blades and other components. One pair of power modules provides power to all the management modules and switch modules, plus any blades that are plugged into slots 1-6. The other pair of power modules provides power to any blades in slots 7-14. Within each pair of power modules, one power module acts as a backup for the other in the event the first power module fails or is removed. Thus, a minimum of two active power modules are required to power a fully featured and configured chassis loaded with 14 processor blades, 4 switch modules, 2 blowers, and 2 management modules. However, four power modules are needed to provide full redundancy and backup capability. The power modules are designed for operation between an AC input voltage range of 200VAC to 240VAC at 50/60 Hz and use an IEC320 C14 male appliance coupler. The power modules provide +12VDC output to the midplane from which all server blade system components get their power. Two +12VDC midplane power buses are used for redundancy and active current sharing of the output load between redundant power modules is performed.

Management modules MM1 through MM2 are hot-pluggable components that provide basic management functions such as controlling, monitoring, alerting, restarting and diagnostics. Management modules also provide other functions required to manage shared resources, such as the ability to switch the common keyboard, video, and mouse signals among processor blades.

Figure 3:
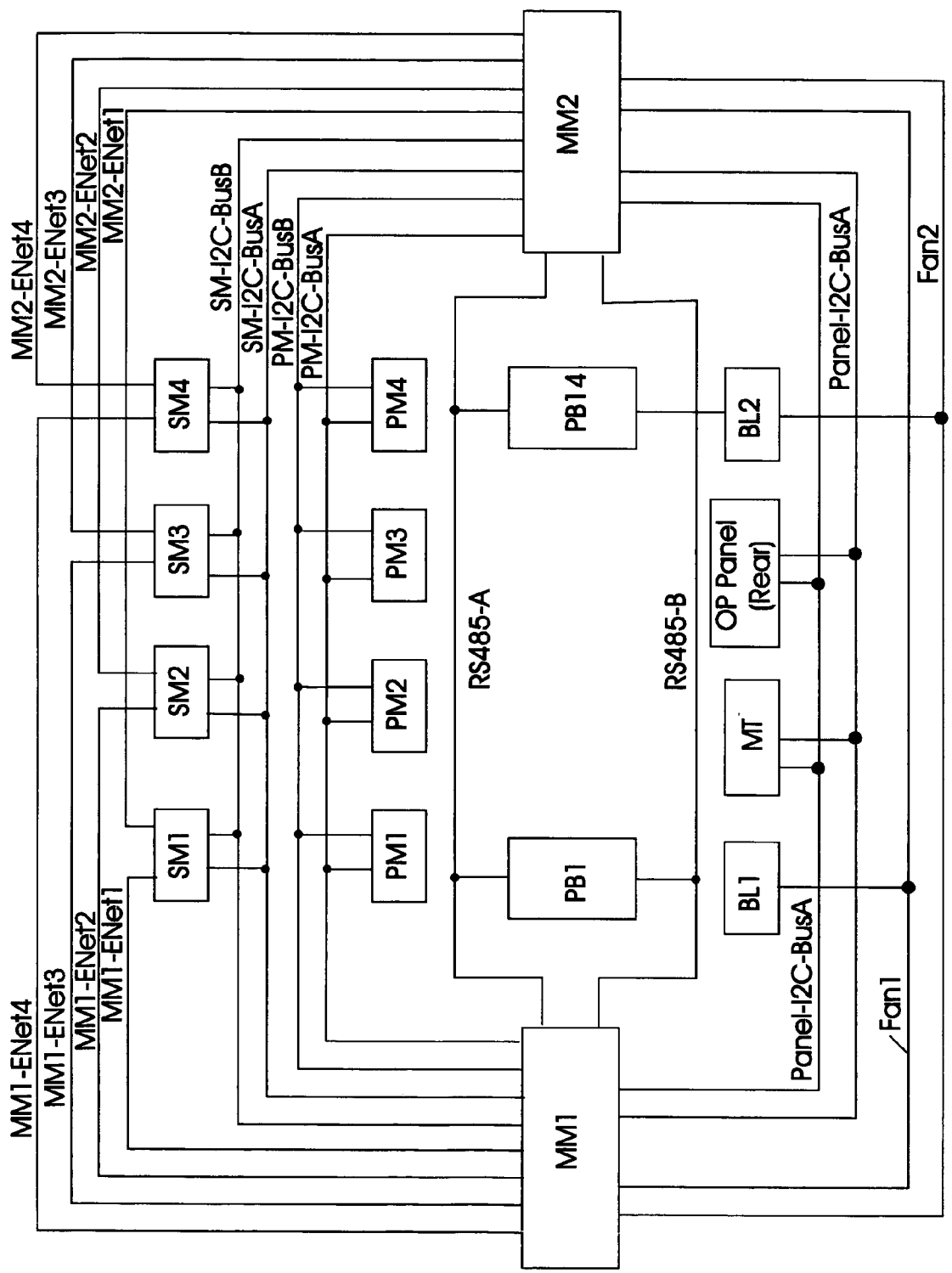
FIG. 3 is a schematic diagram of the server blade system's management subsystem.

FIG. 3 is a schematic diagram of the server blade system's management subsystem. Referring to this figure, each management module has a separate Ethernet link to each one of the switch modules SM1 through SM4. Thus, management module MM1 is linked to switch modules SM1 through SM4 via Ethernet links MM1-ENet1 through MM1-ENet4, and management module MM2 is linked to the switch modules via Ethernet links MM2-ENet1 through MM2-ENet4. In addition, the management modules are also coupled to the switch modules via two well known serial I2C buses SM-I2C-BusA and SM-I2C-BusB, which provide for "out-of-band" communication between the management modules and the switch modules. Similarly, the management modules are also coupled to the power modules PM1 through PM4 via two serial I2C buses PM-I2C-BusA and PM-I2C-BusB. Two more I2C buses Panel-I2C-BusA and Panel-I2C-BusB are coupled to media tray MT and the rear panel. Blowers BL1 and BL2 are controlled over separate serial buses Fan1 and Fan2. Two well known RS485 serial buses RS485-A and RS485-B are coupled to server blades PB1 through PB14 for "out-of-band" communication between the management modules and the server blades.

Figure 4:
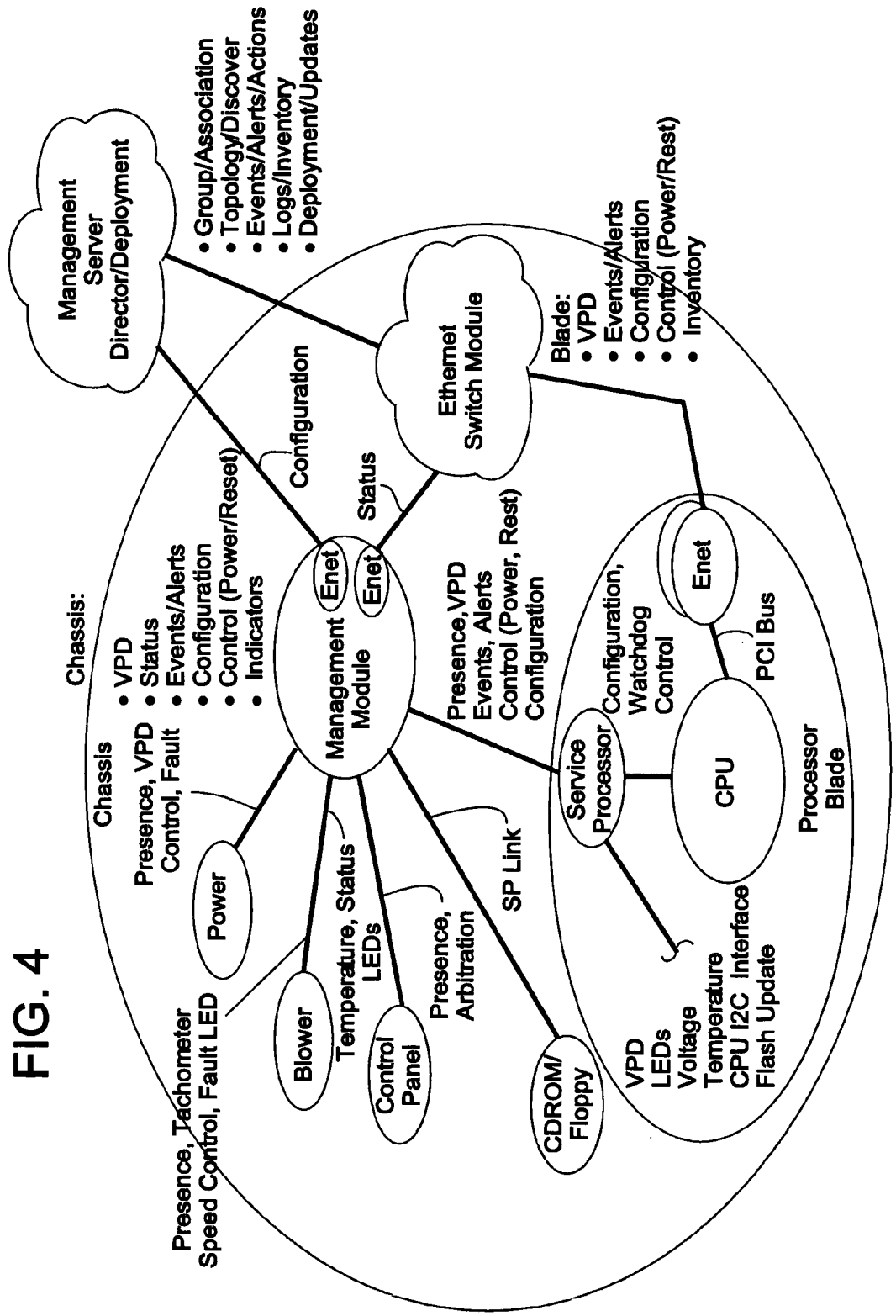
FIG. 4 is a topographical illustration of the server blade system's management functions.

FIG. 4 is a topographical illustration of the server blade system's management functions. Referring to FIGS. 3 and 4, each of the two management modules has a 100 Mbps Ethernet port that is intended to be attached to a private, secure management server. The management module firmware supports a web browser interface for either direct or remote access. Each processor blade has a dedicated service processor (SP) for sending and receiving commands to and from the management modules. The data ports that are associated with the switch modules can be used to access the processor blades for image deployment and application management, but are not intended to provide chassis management services. A management and control protocol allows the management module to authenticate individual blades as part of the blade activation procedure. A management module can also send alerts to a remote console to indicate changes in status, such as removal or addition of a blade or module. A management module also provides access to the internal management ports of the switch modules and to other major chassis subsystems (power, cooling, control panel, and media drives).

The management module communicates with each processor blade service processor via the out-of-band serial bus, with one management module acting as the master and the processor blade's service processor acting as a slave. For redundancy, there are two serial busses (one bus per midplane connector) to communicate with each processor blade's service processor. The processor bade is responsible for activating the correct interface to the top or bottom midplane connector based upon the state of the signals from the active management module. When two management modules are installed, the module in slot 1 will normally assume the active management role, while the module in slot 2 will be reserved as a standby module. In event of management module failure or removal after the chassis subsystems have been initialized, the operation of the processor blades and switch subsystems are not affected. Thus, if both management modules are inactive or removed, the server blade system's components will continue to function, but chassis configuration cannot be changed. Addresses are hardwired for each slot on each top and bottom midplane connector, and used by a processor blade's service processor to determine which processor blade is being addressed on the serial bus.

Each of the four switch modules SM1 through SM4 has a dedicated 100 Mbps Ethernet link to the two management modules MM1 and MM2. This provides a secure high-speed communication path to each of the switch modules for control and management purposes only. The I2C serial links are used by the management module to internally provide control of the switch module and to collect system status and vendor product data ("VPD") information. To accomplish this, the various control and data areas within the switch modules, such as status and diagnostic registers and VPD information, are accessible by the management module firmware. In general, the active management module can detect the presence, quantity, type, and revision level of each blade, power module, blower, and midplane in the system, and can detect invalid or unsupported configurations (e.g., processor blades with Fibre Channel daughter cards connected to Ethernet switch modules.) This function relies upon VPD information within each subsystem as well as signals from the various hardware interfaces or communication via the service processor protocols.

Figure 5:
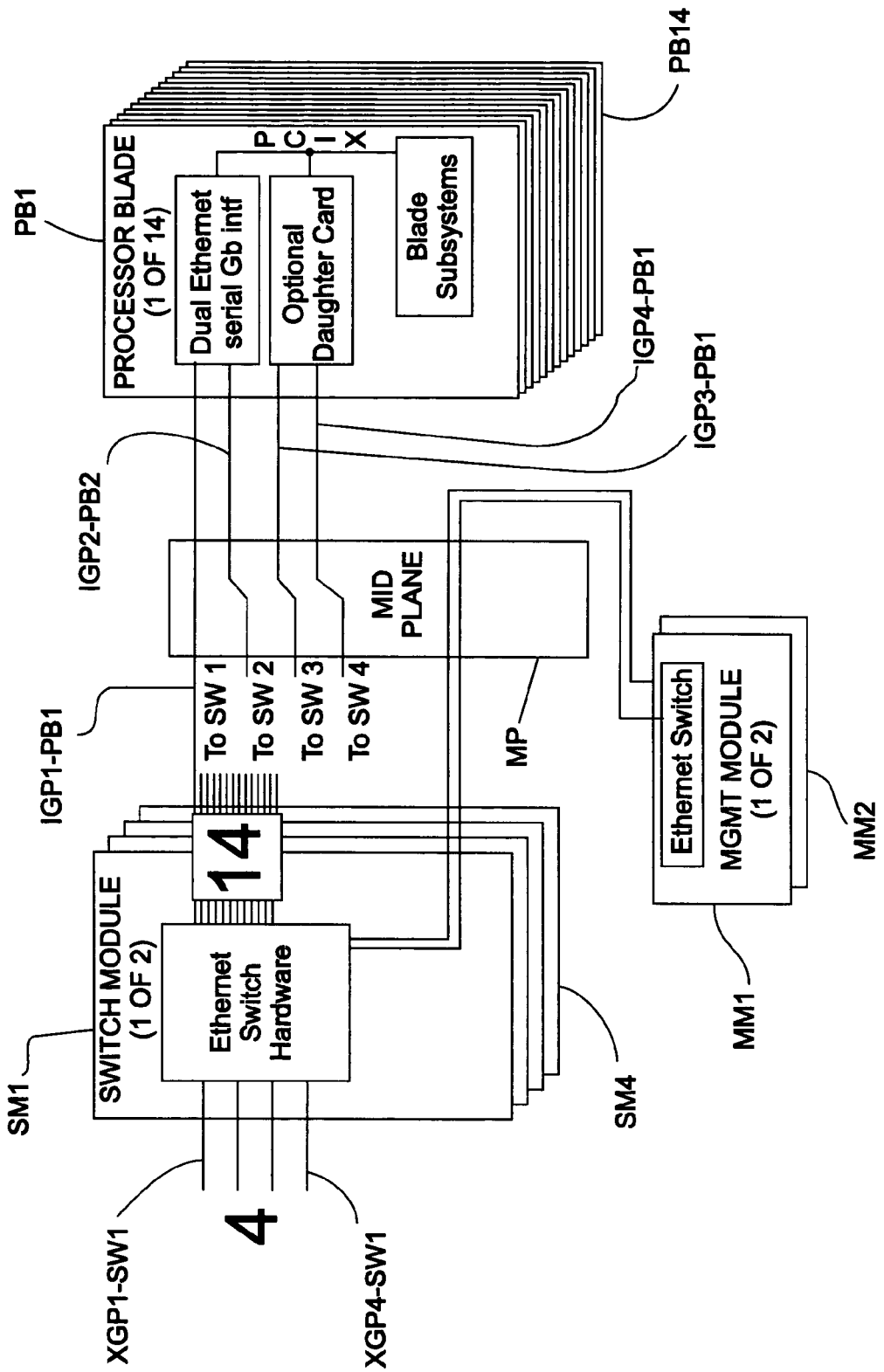
FIG. 5 is a block diagram of the switch module and processor blade interconnection.

FIG. 5 is a block diagram of the switch module and processor blade interconnection. Referring to this figure, each switch module SM1 through SM4 includes four external gigabit ports. For example, switch module SM1 includes external gigabit ports XGP1-SW1 through XGP4-SW1. Each processor blade includes four internal gigabit ports coupling the processor blade to each one of the four switch modules through the midplane connectors. For example, processor blade PB1 includes four internal gigabit ports IGP1-PB1 through IGP4-PB1. In addition, each management module is coupled to the switch module via an Ethernet link.

The Ethernet Switch Modules are hot-pluggable components that provide Ethernet switching capabilities to the server blade system. The primary purpose of the switch module is to provide Ethernet interconnectivity between the processor blades, management modules and the outside network infrastructure. Depending on the application, the external Ethernet interfaces may be configured to meet a variety of requirements for bandwidth and function. One Ethernet switch module is included in the base system configuration, while a second Ethernet switch module is recommended for redundancy. Each processor blade has a dedicated, 1000 Mbps (1 Gbps) full-duplex SERDES link to each of the two switch modules, and each switch module has four external 1 Gbps (RJ45) ports for connection to the external network infrastructure.

Fibre Channel (FC) is an industry standard networking scheme for sharing remote storage devices among a group of servers. Each processor blade includes a connector to accept a Fibre Channel daughter board containing two Fibre Channel ports of 2 Gb each for connection to dual Fibre Channel switch modules. The routing of the Fibre Channel signals occurs through the midplane to the Fibre Channel switch modules in slots 3 and 4 in the rear of the server blade chassis. Each Fibre Channel switch module is hot-pluggable without disruption of blade or chassis operation. The routing of the two Fibre Channel ports is such that one port from each processor blade is wired to one Fibre Channel switch module, and the other port is wired to the other Fibre Channel switch module to provide redundancy. Each Fibre Channel switch module has 2 external 2 Gb ports for attachment to the external Fibre Channel switch and storage infrastructure. This option allows each of the 14 processor blades to have simultaneous access to a Fibre Channel based storage area network (SAN) as well as the Ethernet based communications network.

Shared Simultaneously-connected Drive Implementation

Figure 6:
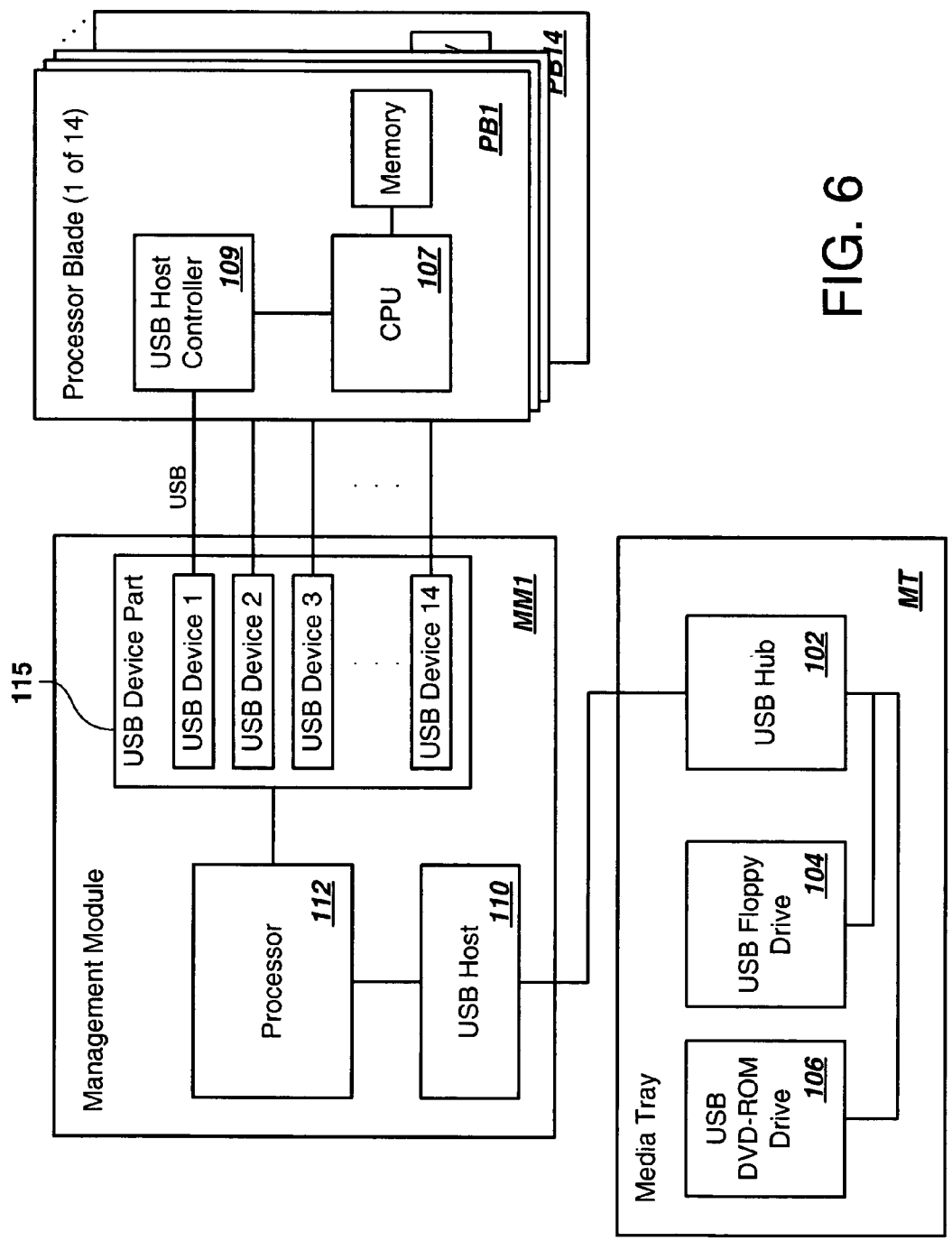
FIG. 6 is a block diagram depicting a multiple server blade system configured according to an embodiment of the present invention.

FIG. 6 is a block diagram depicting a multiple server blade system configured according to an embodiment of the present invention. Referring now to this figure, specific details are shown for one of the two management modules, one of the 14 processor blades, and the media tray. Although described specifically relative to processor blade PB1 and management module MM1, it is to be understood that construction and operational details described herein are applicable to each of the 14 processor blades and to both of management modules MM1 and MM2.

Media tray MT includes a DVD ROM drive 106 and a floppy diskette drive 104. Both drives are constructed with a USB interface for direct connection to a USB hub or a USB host controller. USB hub 102 is used in order to provide an additional USB input connector for the media tray. Operation of USB devices is considered to be well-known in the art. Drives 104 and 106 couple through USB hub 102 to USB host controller 110 housed within management module MM1 for communication with the management module. In operation, access to local drives 104 and 106 is exclusively handled through this interconnection. This is a departure from older designs in which the drives were accessed via a directly-switched electrical connection, i.e., a multiplexed connection, which inherently provided only exclusive access. As will be explained in greater detail below, management module MM1 is constructed and operates in such a way as to allow simultaneous drive sharing of drives 104 and 106 amongst all 14 blades.

Processor blade PB1 includes a CPU 107 which oversees I/O operations and executes blade processing instructions from a memory. Processor blade PB1 further includes a host-side I/O controller shown in FIG. 6 as USB host controller 109. Any USB host controller can be used in the construction of processor blade PB1, such as NEC USB2.0 Host Controller μPD720100A. As will be seen, it is preferable for the USB host controller 109 to support encapsulation of SCSI subcommands.

Management module MM1 includes a management-module-side USB host controller 110, a processor 112, and a USB device part 115. USB host controller 110 interfaces to the media tray MT and couples the drives to processor 112. Processor 112 controls access to the drives housed in the media tray MT and provides the software infrastructure to support simultaneous sharing of the drives amongst up to 14 blades. The processor can be any type of processor which is capable of running an embedded version of Linux; in the product, a PowerPC processor is utilized. The USB host controller used in the construction of management module MM1 can be and preferably is the same type used in processor blade PB1. USB device part 115 comprises 14 USB devices each of which provides a USB device interface for completing the USB circuit originating at each USB host controller in processor blades PB1 through PB14. One such circuit which includes a USB host coupled to a USB device interface through a hardware part is shown in FIG. 6 between USB host controller 109 and USB device 1 included in USB device part 115. USB device part 115 couples each of the USB devices to processor 112 through a standard processor interface. USB device part 115 can be implemented as multiple single device parts or as a device part having multiple devices therein. In the embodiment shown in FIG. 6, USB device part 115 is implemented as a Cypress CY7C68013 EZ-USB® FX2™ USB Peripheral Controller (The EZ-USB and FX2 word marks are owned by Cypress).

Management-module processor 112 maintains separate state machines for the media-tray devices and interfaces through USB host 110 and to each of the 14 processor blade host controllers through USB device part 115.

In operation, an un-switched electrical connection is made between USB device 1 of USB device part 115 and USB host controller 109 once processor blade PB1 is inserted into the chassis CH1. In its standard mode of operation, USB host controller 109 continuously polls its USB ports for device activity. Upon insertion of processor blade PB1 into chassis CH1, USB host controller 109 finds USB device 1, initiates and maintains an uninterrupted USB protocol connection with the USB device interface of USB device 1. One such uninterrupted USB protocol connection is maintained for each of the 14 processor blades PB1 through PB14. These are live and continuous connections.

Although the USB device interface is shown as being provided by a physical USB device, in one embodiment, the device interfaces can be emulated by a processor such as processor 112 if the processor has enough I/O pins and bandwidth available.

USB devices 1-14 are programmable and can appear as any type of device. Processor 112 runs initialization code which programs each of USB devices 1-14 to look like a USB mass storage device which supports the SCSI subclass. The SCSI subclass is used because it supports logical unit numbers (LUNs) within a given channel. USB device parts 1-14 are programmed to show a USB mass storage interface with at least two logical unit numbers, one which corresponds to DVD ROM 106, one which corresponds to floppy drive 104, and others as needed for other storage devices such as a remote network-attached storage (NAS) device (not shown in FIG. 6).

An embedded form of Linux is executed as the operating system for processor 112. The Linux kernel is USB aware and provides low-level drivers for USB and for standard mass storage devices. Processor 112 maintains a separate and independent software stack for each of the USB devices. Each stack presents a plurality of emulated mass storage devices behind each of the USB devices of USB device part 115. One mass storage device is emulated for each LUN programmed into USB device part 115. Processor-blade CPU 107 initializes by querying USB host controller 109 for device types present. As a result of this query, and according to the configuration shown in FIG. 6, USB host controller 109 passes control codes back to CPU 107 informing CPU 107 of the presence of mass storage devices having a SCSI subclass and accessible through their respective logical unit numbers. To access the emulated drives, CPU 107 embeds SCSI subcommands within USB commands across the USB interface and directs the commands to a specific drive by including a logical unit number with each command. Such an initialization and interconnection is initiated and maintained for each of the 14 processor blades.

Thus, CPU 107 initiates I/O operations by sending SCSI commands encapsulated in a USB packet to the emulated devices. From the perspective of each processor blade, at least two mass storage devices are seen at the USB device connection.

The packets are received by the individual USB devices within USB device part 115. Each USB device (1-14) then strips off the USB packet wrapper, appends the logical unit number and the blade number (or other asset of each blade such as the processor slot number or other identifier), and sends the SCSI commands to the management-module processor 112 for further processing.

Virtual SCSI software executing on processor 112 decodes the received SCSI commands and creates an association in its memory relative to which logical unit number and blade number the received commands relate to. This software is also responsible for translating the commands into the appropriate to read or write command which is compatible to the target drive in media tray MT which corresponds to the logical unit number associated with the command. The target drive which corresponds to the logical unit number can be DVD ROM drive 106, floppy drive 104, or other remote drives as described above. In the embodiment shown in FIG. 6, the translation of the SCSI commands is to USB commands which correspond to DVD ROM drive 106 and floppy drive 104. However, the translation can be to any of the industry standard drive interfaces depending on the type of drive used in media tray and the implementation of the interface thereto. The virtual SCSI software then groups and keeps track of the incoming commands and serializes the commands to avoid contention. Once serialized, the translated commands are redirected to the target drive. The result of the command is passed back to the USB device and ultimately to the USB host controller on the blade that originated the command based on the association stored memory.

In the present embodiment, the commands are serialized in FIFO fashion. However, in other embodiments a prioritization scheme can be implemented.

In one embodiment, access to the media tray is optionally conditional. Accordingly, the translated commands received by processor 112 are passed to the targeted devices of media tray MT or suppressed in response to a predetermined condition. The predetermined condition in the preferred embodiment is an authentication scheme. Where the predetermined condition is extant, processor 112 passes the translated command to the targeted drive and returns the result of the translated command through the associated USB device or path in response to the predetermined condition. In returning the command, the processor reverse translates the result and through the USB device part 115 encapsulates (effectively reverse encapsulates) the result as needed. In other embodiments the reverse encapsulation can be performed by processor 112. Where the predetermined condition is not present, processor 112 suppresses the translated command to said drive and returns an indication through the associated USB device or path that no media is present irrespective of whether media is present in the target drive.

As a result of the above described configuration and operation, and assuming authentication is giving to all blades, each and every blade sees at least a local optical drive and a local diskette drive always connected. The blade only sees media in the associated drive if it is authorized to access that drive and if there is actually media in the drive. This applies whether or not the targeted drive is a removable media drive or a standard storage drive such as a network attached storage device. Even though a network attached storage device has no removable media capability, it is emulated by processor 112 as a mass storage device having removable media and access is conditionally denied by reporting that no media is present irrespective of whether media is present in the network attached storage drive. Similarly, access can be conditionally denied to a thumb drive plugged into the available USB port on USB hub 102.

Processor 112 maintains a cache of the contents of the drives in order to provide for faster access to data and to better service simultaneous requests to common media such as common software installation media. In one embodiment, the caching can be to a high-speed disk drive such that the entire contents of a slower removable media can be made available to all processor blades simultaneously at a higher speed.

FIG. 7 depicts a 14×N matrix maintained in memory according to an embodiment of the present invention for controlling access to shared simultaneously-connected drives. Referring now to FIG. 7 and also FIG. 6, processor 112 maintains a matrix of 14×N tables, one table each for N shared drives to which access is controlled. In the example shown in FIG. 7, three tables are shown for each of a DVD ROM (logical unit 0), a floppy drive (logical unit 1), and a network attached storage device (logical unit N). Relational data is maintained in each table wherein each row of each table corresponds to one of the 14 processor blades. Column 118 of each table identifies a processor blade number (or an asset of the processor blade). For each table, column 124 maintains the variable which identifies the access type which is provided for each blade. The access types are enumerated and access type 1 indicates that a specific blade is to be given unrestricted access. This is the default for all blades. Access type 2 indicates that authentication is required. Access type 3 indicates that access is to be disabled for the particular blade specified. Other access types are contemplated such as access types requiring biometric confirmation, local vs. remote access types, whether a particular blade (or asset of a particular blade such as a user) is allowed to eject media, whether access is allowed to be exclusive, etc. The access type carries its own enumeration value for identification purposes. Column 126 of each table in the matrix maintains a variable for each blade which conditionally indicates whether access requests received by a particular blade are generally grantable. A value of 1 in the Access Granted column 126 indicates that request and selection menus such as those shown in FIGS. 8 and 9 need not be shown to a user and that an access can proceed where no other conditions preclude such access, as in, for example, an exclusive grant condition as will be explained in more detail below as description ensues.

The system of FIG. 6 allows a user to request access to a drive for a particular blade if access is not available and optionally allows the user to select exclusive access of a drive to a particular blade. FIG. 8 shows a user interface screen for such selection. Once a blade is selected, the user is presented with the interface screen shown in FIG. 9. The user interface screen of FIG. 9 allows a user to specify a specific drive or drives, and if required, allows a user to enter authentication data if type 2 access is provided by processor 112 for the selected blade.

Referring again to FIG. 7 and to FIG. 6, where exclusive access is requested by a user, a timestamp is maintained in column 120 of the table for denoting the time of the request. The time of the request is denoted in order to resolve conflicts which come about as a result of multiple requests by users of the server blade system, including remote users. Column 122 records the exclusive grant given to a server blade. When an exclusive request is received, processor 112 waits for an idle bus condition for the target drive and grants exclusive access to the requesting blade having the oldest timestamp and simultaneously sets the exclusive grant bit in column 122 for the blade. All other blades retain an exclusive grant bit of value of 0. For security reasons, the Access Granted values in column 126 are not updated to a value of 0 to reflect non-access during an exclusive access grant (any 1 value in column 122). Thus, column 122 temporarily overrides column 126 during the exclusive grant.

Figure 10:
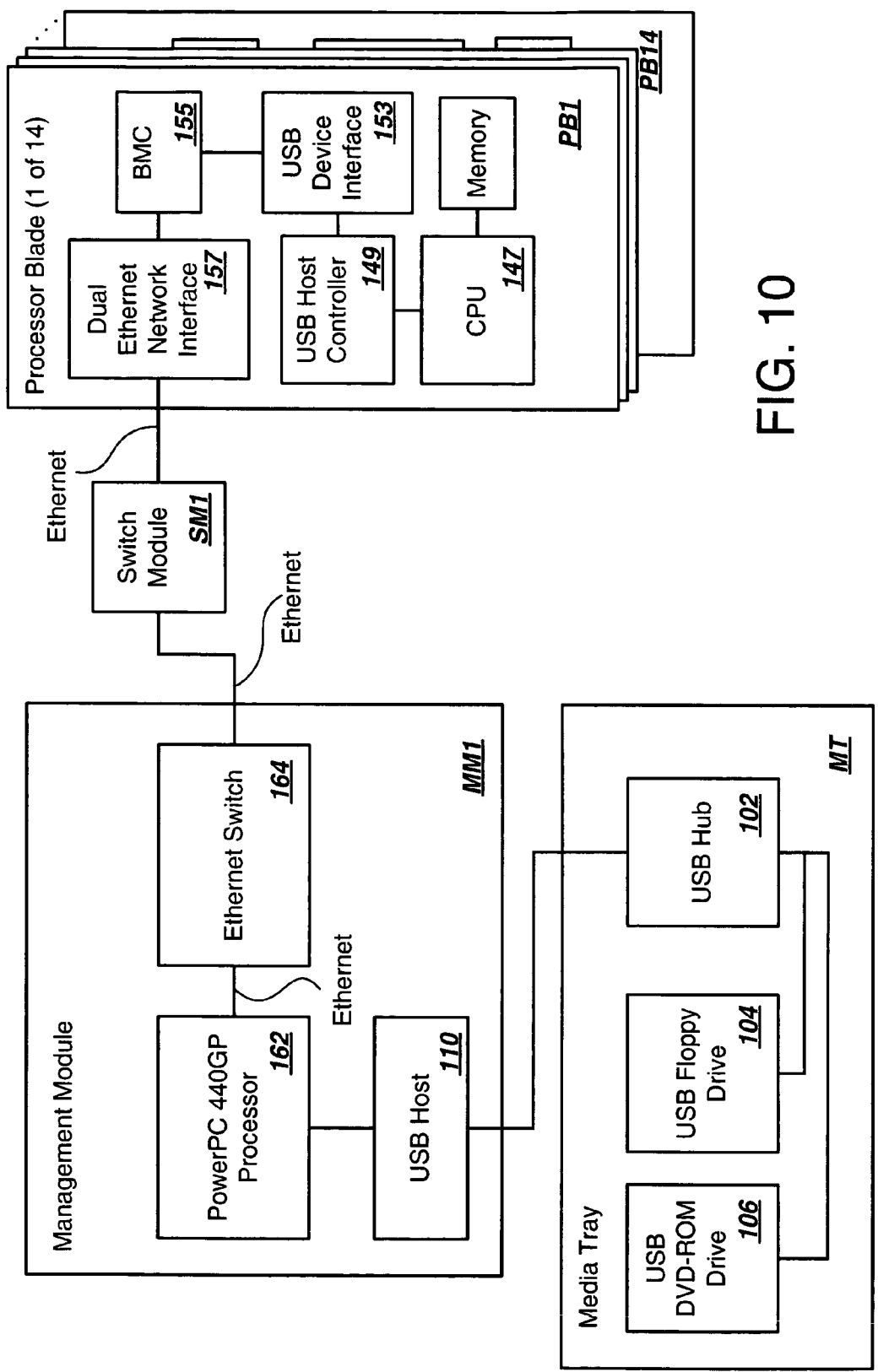
FIG. 10 is a block diagram depicting a multiple server blade system configured according to an embodiment of the present invention.

FIG. 10 is a block diagram depicting a multiple server blade system configured according to an embodiment of the present invention. In the embodiment shown in FIG. 10, in which like numerals are used to show similar function to those components in previous figures, the USB device interface is logical and is no longer provided by a physical USB device on the management module MM1 for each blade. Rather, the logical device interface is provided through the ethernet subsystem to management module MM1 by way of an emulated USB device on each blade. A PowerPC 440GP Processor 162 is used in this embodiment. This processor incorporates an ethernet interface and reduces the total parts count required in the construction of management module MM1. Processor 162 performs the emulation of mass storage devices and the other functions described with respect to FIG. 6 for processor 112.

The previously described ethernet subsystem which consists of ethernet switch 164, switch module SM1, and network interface 157 couples management module MM1 to processor blade PB1. All processor blades are connected in a similar fashion through switch modules SM1-SM4. Baseboard management controller (BMC) 155 is generally used for communication with management module MM1 to configure and maintained other resources in the server blade system. In this embodiment, BMC 155 provides an ethernet path for the coupling the mass storage devices emulated at processor 162 to the USB device interface 153. USB device interface 153 is a microcontroller part which emulates a USB device for connection to USB host controller 149. Although shown as a separate part, USB device interface 153 can be integrated into BMC 155 by upgrading that microcode and providing the two I/O USB pins required by the USB host controller. CPU 147 functions similarly to CPU 107 in FIG. 6.

Thus, in this embodiment, an additional translation is made to ethernet which must be derived or decoded by processor 162 on the receiving end. USB host controller 149 maintains an uninterrupted protocol connection with USB device interface 153 as before, only, there is an extra layer of virtualization. The logical unit numbers (used for directing packets to specific drives whose presence is provided by processor 162 through emulation) can be assigned either at processor 162 or at USB device interface 153, however in the embodiment shown in FIG. 10, both the logical unit number and the blade number are appended to each packet by USB device interface 153. Alternatively, logical unit numbers and/or blade unit numbers can be derived by processor 162 from the Mac address of the received ethernet packets and the request type.

Remote drives (not shown), such as network attached storage devices, can be virtualized in a similar manner as the local DVD ROM drive and local floppy drive. In the case of a network attached storage device, the device can be coupled to processor 112 through one of the processor's other ethernet ports. Otherwise, the embodiment shown in FIG. 10 operates similarly to the embodiment shown in FIG. 6.

An embodiment of the present invention may be provided as a computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media\machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

Similarly, an embodiment of the present invention may be provided as a method in which a service provider deploys computing infrastructure and program product in combination such that, once deployed, the combination performs a process according to any of the embodiments of the present invention.

In the drawings and specifications there has been set forth a preferred embodiment of the invention and, although specific terms are used, the description thus given uses terminology in a generic and descriptive sense only and not for purposes of limitation.

We claim:

1. Apparatus comprising:
    a storage device;
    a plurality of device interfaces;
    a processor which couples said plurality of device interfaces to said storage device; and
    a plurality of I/O controllers each maintaining an uninterrupted protocol connection with one of said device interfaces;
    wherein said processor is effective to:
        serialize peripheral bus commands which are received at said device interfaces from said plurality of I/O controllers; and
        in response to receiving a specific command originating from a specific one of said I/O controllers:
            pass the specific command to said storage device and return the result of the specific command through the specific one of said I/O controllers in response to a predetermined condition; and
            suppress the specific command to said storage device and return an indication through the specific one of said I/O controllers that no media is present irrespective of whether media is present in said storage device in response to a lack of the predetermined condition.

2. Apparatus of claim 1 wherein the uninterrupted protocol connection is a logical connection.

3. Apparatus of claim 1 wherein the uninterrupted protocol connection is to a physical I/O device that provides the device interface.

4. Apparatus of claim 3 wherein the I/O device is a USB device.

5. Apparatus of claim 1 wherein the peripheral bus commands are encapsulated as sub-commands of the protocol maintained by said plurality of I/O controllers.

6. Apparatus of claim 1 wherein the predetermined condition is that an asset associated with the specific one of said I/O controllers is authorized to access said storage device.

7. Apparatus comprising:
    a removable-media drive;
    a plurality of device interfaces which receive removable-media-drive commands;
    a processor which couples said plurality of device interfaces to said removable-media drive; and
    a plurality of server blades each housing an I/O controller which maintains an uninterrupted protocol connection with one of said device interfaces and which sends removable-media-drive commands or the one of said device interfaces;
    wherein said processor is effective to:
        serialize commands which are received at said device interfaces from the I/O controllers housed in said plurality of server blades; and
        in response to receiving a specific command originating from a specific one of said plurality of server blades:
            pass the specific command to said removable-media drive and return the result of the specific command to the specific one of said plurality of server blades in response to a predetermined condition; and
            suppress the specific command to said removable-media drive and return an indication to the specific one of said plurality of server blades that no media is present irrespective of whether media is present in said removable-media drive in response to a lack of the predetermined condition.

* * * * *